United States Patent [19]

Keklak et al.

[11] Patent Number: 4,680,571
[45] Date of Patent: Jul. 14, 1987

[54] TRAILER CREEP ALARM

[75] Inventors: Ronald Keklak, Amston, Conn.;
Michael V. Couture, Holyoke, Mass.;
John C. Whitehouse, Winsted, Conn.;
Marshall W. Payne, Chicopee, Mass.

[73] Assignee: Dedicated Technologies, Inc., Springfield, Mass.

[21] Appl. No.: 711,447

[22] Filed: Mar. 13, 1985

[51] Int. Cl.[4] .................. B60Q 1/00; G08B 21/00
[52] U.S. Cl. .................. 340/52 R; 340/668
[58] Field of Search ............ 340/52 R, 686, 675, 340/668; 200/61.13, 61.14, 61.15; 242/148; 180/274

[56] References Cited

U.S. PATENT DOCUMENTS

| | | | |
|---|---|---|---|
| 1,238,532 | 8/1917 | Lemberg | 340/565 |
| 2,810,120 | 10/1957 | Parker | 340/686 X |
| 3,217,291 | 11/1965 | King | 340/29 |
| 3,405,388 | 10/1968 | Byrne | 340/686 X |
| 3,418,627 | 12/1968 | Lyons | 340/29 |
| 3,690,285 | 9/1972 | Ellison | 114/206 R |
| 3,802,085 | 4/1974 | Schoonmaker | 33/172 F |
| 3,887,909 | 6/1975 | Beiswenger et al. | 340/548 X |
| 3,938,122 | 2/1976 | Mangus | 340/52 R X |
| 3,957,013 | 5/1976 | Ignatjev | 116/81 |
| 4,186,939 | 2/1980 | Woods | 340/52 R X |
| 4,250,486 | 2/1981 | Kiefer et al. | 340/52 R |

OTHER PUBLICATIONS

Promotional literature put out by Rite-Hite ®, 9019 North Deerwood Drive, P.O. Box 23043, Milwaukee, Wisconsin 53223, about the DOK-LOK ®.

Primary Examiner—Glen R. Swann, III
Assistant Examiner—Thomas J. Mullen, Jr.
Attorney, Agent, or Firm—Donald S. Holland

[57] ABSTRACT

An alarm system is disclosed for warning personnel at a loading dock that a trailer being loaded has crept away from the dock. In a preferred embodiment, the alarm comprises a box-like housing that can be bolted onto the dock; a clamp that is magnetically held against the outside of the housing and which can be removed for quick attachment to a nearby trailer; and, a spring-loaded cord that is spool fed from inside the housing and connected to the clamp. After the clamp has been attached to the trailer, the alarm automatically arms itself through the use of a novel timing mechanism and spring-loaded actuating arm inside the housing. If the trailer then creeps, it tugs the cord, which causes the arm to trigger the alarm. The alarm stays on but can be automatically shut off by simply replacing the clamp back onto the housing.

27 Claims, 25 Drawing Figures

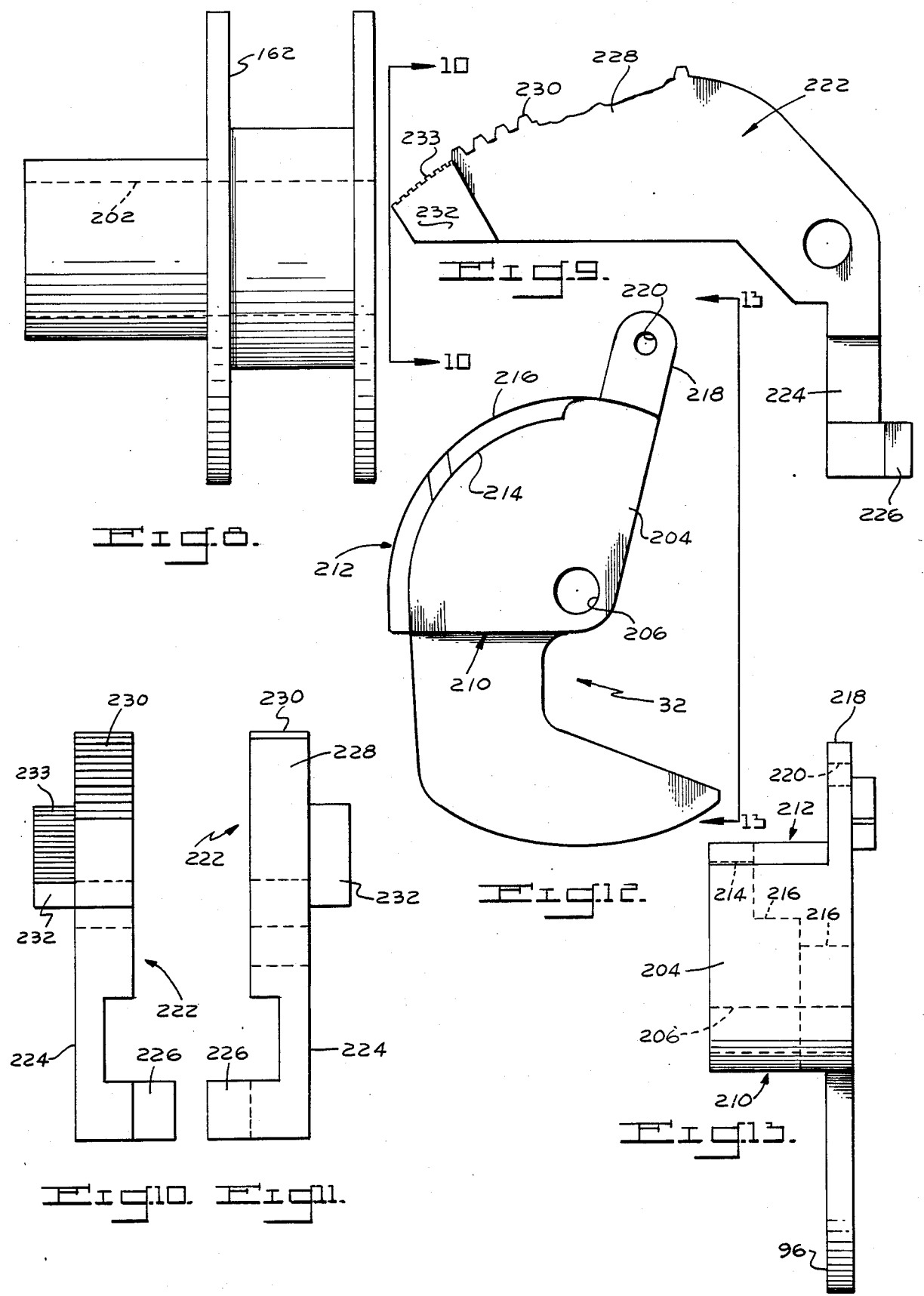

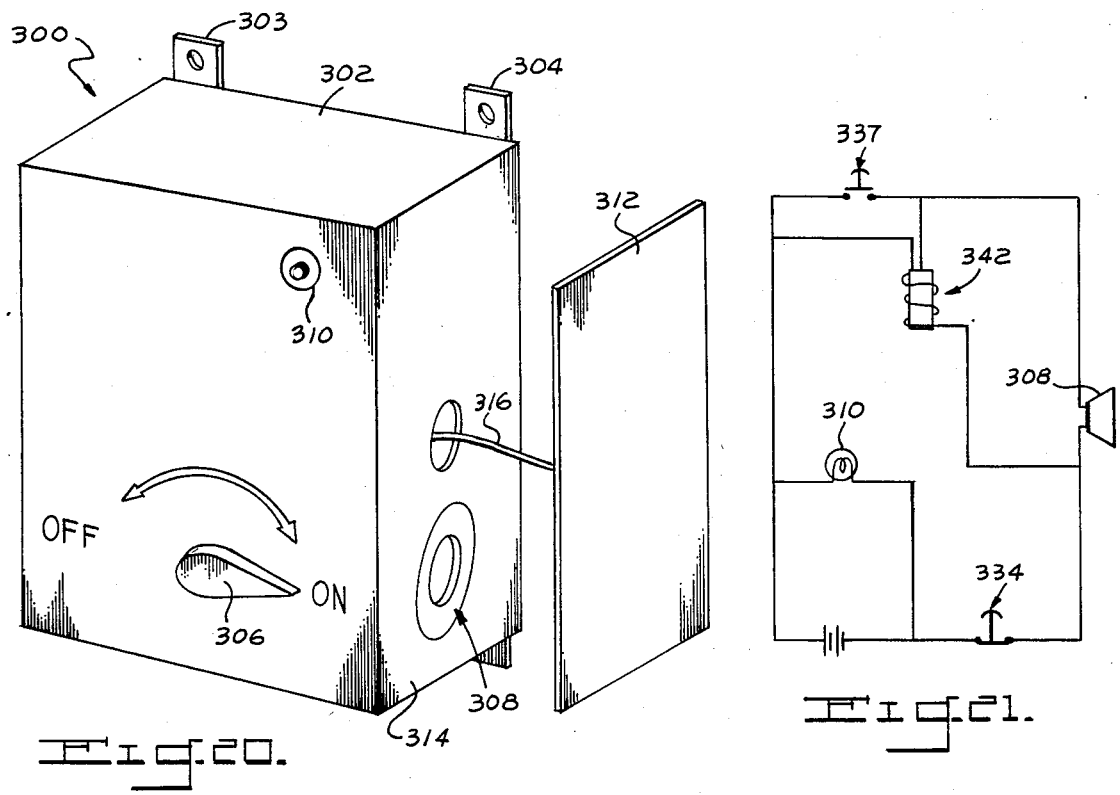
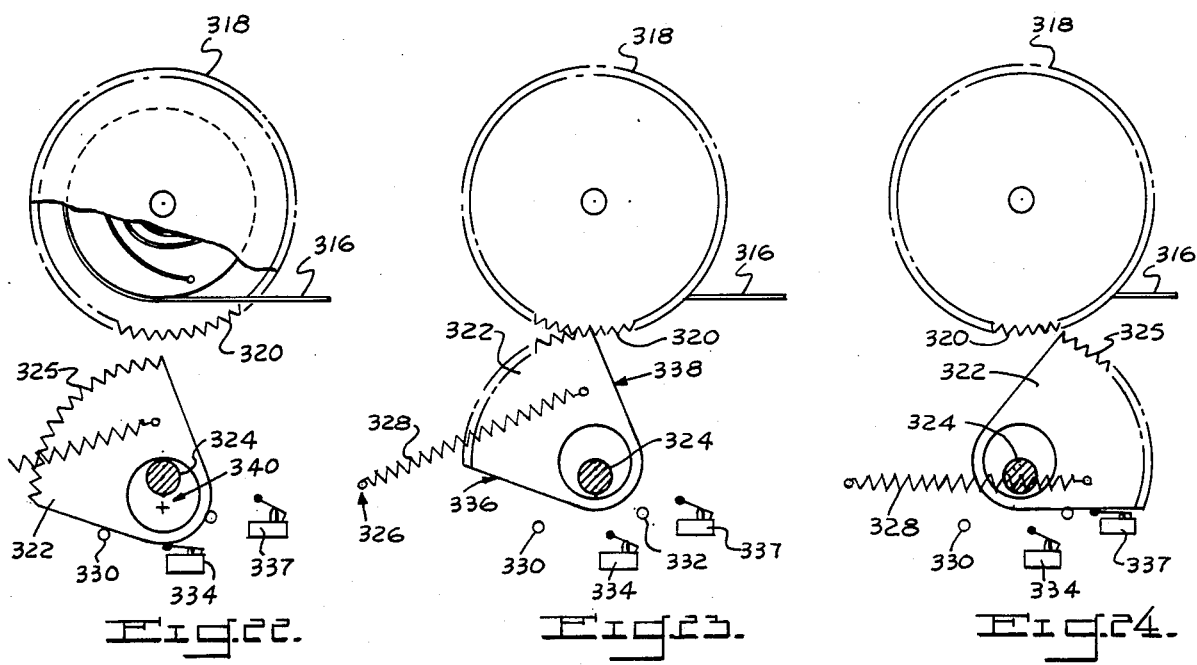

TRAILER CREEP ALARM

BACKGROUND OF THE INVENTION

This invention relates to alarms that indicate undesired vehicle movement.

Various alarms have been devised to warn people that a vehicle has moved in general or drifted from a desired location, For example, U.S. Pat. No. 3,217,291 to King, U.S. Pat. No. 3,418,627 to Lyons and U.S. Pat. No. 3,690,285 to Ellison show drift indicators for anchored boats.

While these devices are adequate for indicating that a boat has drifted too far from its mooring, they are cumbersome and somewhat complex. Perhaps that is why their general concept has not been applied to indicate and thereby prevent a similar problem in the trailer truck industry—namely, a common cause of accidents at loading docks, known as "trailer creep".

That is when a trailer inches forward, separating from a loading dock. Often, the movement is slow and undetected until it is too late. When that happens, the loading bridge between the trailer and dock falls. If a person or forklift operator is on the bridge, down he goes, and the results can be disastrous.

Dock safety systems have been designed to try to prevent this problem. For example, wheel chocks are sometimes placed under a truck's wheels. While these chocks normally prevent the trailer from creeping, they have definite drawbacks: they sometimes slip under the wheels and allow undetected motion; they must be positioned precisely under the wheels to be effective; they require personnel to leave a dock platform to install them under the wheels; they are heavy and cumbersome to carry; and, if they are forgotten and not removed prior to a truck leaving the dock, they can be run over, with the result being damage to the truck or its cargo.

A more sophisticated system has recently been developed to stop trailers and trucks from creeping. It is called the DOK-LOK ®, produced by the Rite-Hite Corporation of Milwaukee, Wis.

The DOK-LOK ® is a large safety unit that is permanently mounted onto a loading dock. The unit has a movable clamp that can be hooked onto a docked trailer's "I.C.C. bar". When engaged, the clamp firmly holds the bar and keeps the trailer from moving.

While the DOK-LOK ® works, it too has drawbacks. Specifically, the unit is relatively expensive and difficult to install; it requires extensive maintenance; it requires the docked trailer to have an undamaged I.C.C. bar in order to function; and, it can cause damage to the attached truck or dock if it is not disengaged before the truck "pulls away" from the dock.

Accordingly, it is a primary object of the present invention to prevent dock accidents caused by trailer creep, but by a simpler means than heretofore seen.

It is a general object to provide a simple movement detector which will automatically provide an alarm and alert personnel in a loading area that a trailer is moving or creeping forward so that steps can be taken to arrest the trailer before damage or injury is incurred.

It is a more specific object to provide a compact creep alarm that can be easily installed onto a dock, wherein the unit has a spring-loaded, spool-fed cord that can be easily attached to a docked trailer, by either a clamp or magnetic plate. If the trailer creeps after the alarm is "armed", it tugs the cord, which triggers the alarm.

It is another object to provide an automatic creep alarm that will automatically arm itself after a retractable cord is pulled from the alarm's housing and clamped onto a trailer or truck.

It is a further object to provide a creep alarm that is inexpensive to manufacture, yet extremely durable and safe to use.

The above and other objects and advantages of this invention will become more readily apparent when the following description is read in conjunction with the accompanying drawings.

SUMMARY OF THE INVENTION

A simple "Trailer Creep Alarm" is disclosed for automatically indicating that a trailer has crept away from a dock platform during loading. The alarm will provide a warning to alert personnel in the loading area that the trailer is moving or creeping forward so that steps can be taken to arrest this movement before damage or injury occurs.

In the preferred embodiment, the alarm includes an outer housing that is bolted onto the dock; a clamp that is magnetically held against the housing and which can be removed for quick attachment onto a docked trailer; and, a spring-tensioned cord that is connected to the clamp and which is retractably spool fed from inside the housing.

After the clamp is attached to the trailer, the alarm automatically sets itself in a "ready" position through the cooperative use of a novel timing mechanism and a spring-loaded, pivotable actuating arm inside the housing. Once the timer runs out, any subsequent creepage of the trailer causes the alarm's cord to be tugged, whereupon a "ratchet" mechanism causes the arm to pivot and trigger the alarm.

In a second embodiment, the alarm is not automatically set. Instead, it is manually set by turning a switch handle on the outside of the alarm's housing. The handle is attached to a novel spring-loaded cam inside the housing that cooperates with a spool assembly to trigger the alarm when its cord is tugged.

BRIEF DESCRIPTION OF THE DRAWINGS

FIG. 8 is a side elevational view of a drive spool shown next to the spool assembly in FIG. 3A;

FIG. 9 is a side elevational view of a pawl shown in FIG. 3A;

FIG. 10 is an end plan view of the pawl taken along line 10—10 in FIG. 9;

FIG. 11 is an opposite end view of the pawl;

FIG. 12 is a side elevational view of an actuating arm shown in FIG. 3A;

FIG. 13 is an end plan view of the arm taken along line 13—13 in FIG. 12;

FIG. 20 is a perspective view of another embodiment of the present invention;

FIG. 21 is a schematic of the electrical circuitry for this second embodiment; and, FIGS. 22–24 are schematics of this second embodiment in various stages of operation.

DETAILED DESCRIPTION OF THE PREFERRED EMBODIMENTS

Figure 1:
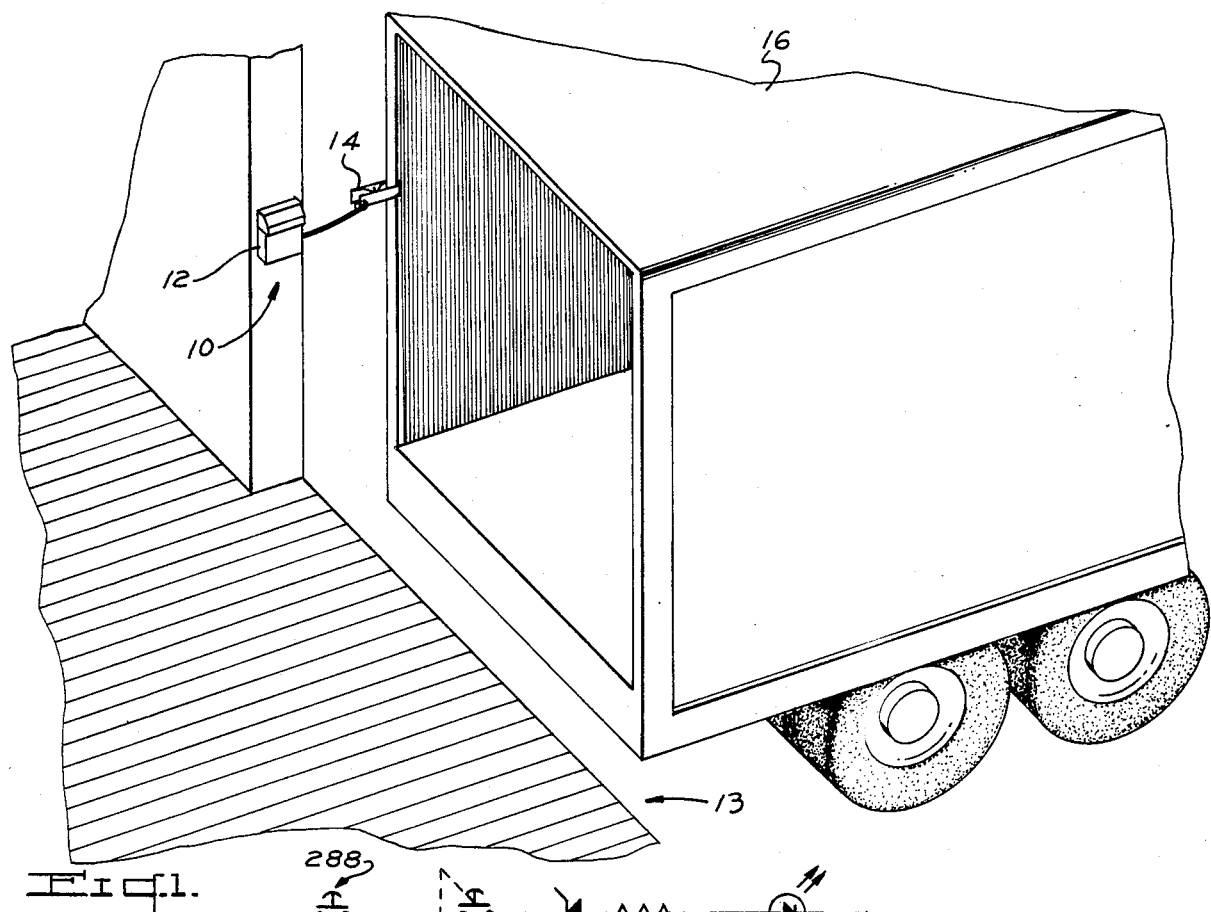
FIG. 1 shows a preferred embodiment of the present invention, wherein a "Trailer Creep Alarm" is mounted on a loading dock's wall and a tensioned cord from the unit is removably connected to a nearby trailer.

Referring to FIGS. 1–19, the preferred "automatic" embodiment of the "Trailer Creep Alarm" is shown and generally designated by the reference numeral 10. As best shown in FIGS. 1, 3 and 3A, the assembled unit includes an outer housing or boxlike shell 12 that can be bolted onto a loading dock 13; a clamp 14 that is magnetically held against the outside of shell 12 and which can be removed for quick attachment to a nearby docked trailer 16; and, an inner frame or subhousing 20 which is slidably received within the shell 12 and which includes two compartments 22, 24 that contain the innards or main working components of the alarm. Lower compartment 22 contains a load warning horn 26, a battery (not shown) and a battery recharger 28, while upper compartment 24 contains the following items: a spring-tensioned cord 29 that is connected to the clamp 14 and retractably fed from a spool assembly 30; and, a rotatable actuating arm 32 that cooperates with a timing device 40 to automatically set the alarm in a "ready" position after the clamp 14 is attached to the trailer.

Referring to FIG. 3, the outer shell 12 is open at its top 41 and bottom 42. It is made of durable sheet metal. Its construction basically comprises a squared U-shaped piece 43 with a pair of inturned, facing flanges or vertical strips 44, 46. A backing plate 48 is fixedly attached to the outside of these flanges by any suitable means, such as spot welding.

Backing plate 48 is longer than piece 42 and is centered against the back of it. The plate's end portions 50, 52 extend beyond the piece 43 and are specifically designed to act as mounting strips for the unit. These end portions 50, 52 are angularly offset and include holes for bolting the unit onto a loading dock (see FIG. 1) with two of these holes being shown at 54, 56.

When the unit is mounted, piece 42 forms the shell's front 58 and sides 60, 62. Along the inside bottom of side 62 is a small L-bracket 64 that has been spot welded onto the shell, so that the bottom portion of the bracket is flush with the bottom of side 62. This bracket acts as a stop for the inner frame 14 after it is slid through the open top of the shell. Note that the side 62 includes a hole 65 through which a bolt 66 can be screwed into an aligned, threaded hole in a cross brace 70 of frame 14 to hold the frame securely in place.

The drawings also show similar bolts 66, standard metal screws 71, nuts 72 and various metal and plastic flat washers 73, 74. Since these parts are conventional, the same numbers for similar parts have been used in the drawings, even though different sizes would be used for attaching the various components.

Near the top of each side 60, 62 is a pair of spaced holes (75, 76 and 77, 78) which permit a removable top 79 to be screwed onto the shell after the subhousing or inner frame 14 is slid into place. In the preferred embodiment, the top is a rhomboidal cover that is made of any suitable see-through plastic, such as LEXAN ®. This cover is tinted red and puts forth an excellent visual warning when a flashing light 80 (see FIG. 3A) inside of it is triggered by the alarm.

As best shown in FIG. 3, the shell's front face 58 includes a pair of display holes 81, 82. A green L.E.D. (element no. 83 in the FIG. 2 schematic, but otherwise not shown) shines through upper hole 81 to indicate when the alarm is set. A red L.E.D. (element no. 84 in FIG. 2) shines through the lower hole to indicate when the rechargeable battery 28 is "running low".

Along the shell's side 62 is a metal mounting section 86 for clamp 14. This mounting section includes a squared U-shaped lip or rim 88 that is welded onto the outside of piece 43. It acts as an excellent locater for precisely mounting the clamp 14 in a desired location on the housing.

Within the rim's boundary is a vertical slot 92. This slot passes through side 62 and permits a pivotable tip 96 of arm 32 to protrude through the side. When the clamp is magnetically mounted within the rim, it blocks the slot and depresses the tip.

Clamp 14 is best illustrated in FIG. 3. It includes a pair of substantially identical, opposing plates 108, 110 with upturned, clamping ends at 112. A thin, magnetic mounting plate 90, such as Model No. 1317 manufactured by Adams Magnetic Products, is fixed onto the backside of clamp plate 108. It provides a sufficient magnetic attraction to firmly, but removably, attach the clamp 14 onto section 86.

Clamp plates 108, 110 have rabbit ears on each side, with two shown at 116, 118. These ears have aligned holes (not shown) through which a trunnion pin 120 passes so as to allow the plate's clamping ends to be pivoted away from one another in a standard manner. A clamp torsion spring 122 is wrapped around the pin and presses against the "opened" plate ends 124, 126 to keep the clamp in a normally closed position Note that clamp plate 108 includes a hole with a ring 130 for fixedly attaching the cord's free end 132 to the clamp.

The inner frame 20 for housing the main components of the alarm 10 is best shown in FIG. 3A. Like outer shell 12, it is made of durable sheet metal. Its upper compartment 24 consists of a single bent piece 134 with an integral top 136 welded onto the piece's own inturned flange 138. The piece's sides 140, 142 are secured by the interconnecting cross brace 70.

As viewed from right to left in FIG. 3A, sides 140, 142 contain aligned holes 144, 146 for mounting actuating arm 32; side 140 contains a "diamond" cutout 148 for allowing a mounted "triple" microswitch 150, such as Model No. 15585 manufactured by Cherry Electrical Products Corp., to extend into the compartment; side 140 contains vertically spaced holes 152, 154 that align with holes 81, 82 in shell 12 to provide the "on" and "low voltage" L.E.D. displays; side 140 contains a central hole 156 for both bolting a mounting plate 158 for switch 150 onto the side and for acting with an aligned hole (not shown) to mount the spool assembly 30 within the compartment; sides 140, 142 contain aligned holes (with only one shown at 160) for mounting a drive spool 162 that spring tensions the spool assembly 30; side 140 includes another hole 164, above hole 160, for bolting a standard timer 40 into place, such as Model No. 83029 manufactured by Solid State Advanced Control, Inc.

The upper compartment's top 136 includes a central hole 166 for mounting a standard light bulb, such as Westinghouse's Model No. 95354. Two screw holes 168, 170 are provided in the top for attaching a standard bulb socket 172 below the bulb, such as Model No. 97871 manufactured by Leecraft Mfg. Co., Inc. An adjacent hole 174 is punched into side 142 so that a standard flasher 176 for the bulb, such as Ideal Corporation's Model No. 44931, can be riveted in place by the illustrated pop rivet 178.

Figure 3:
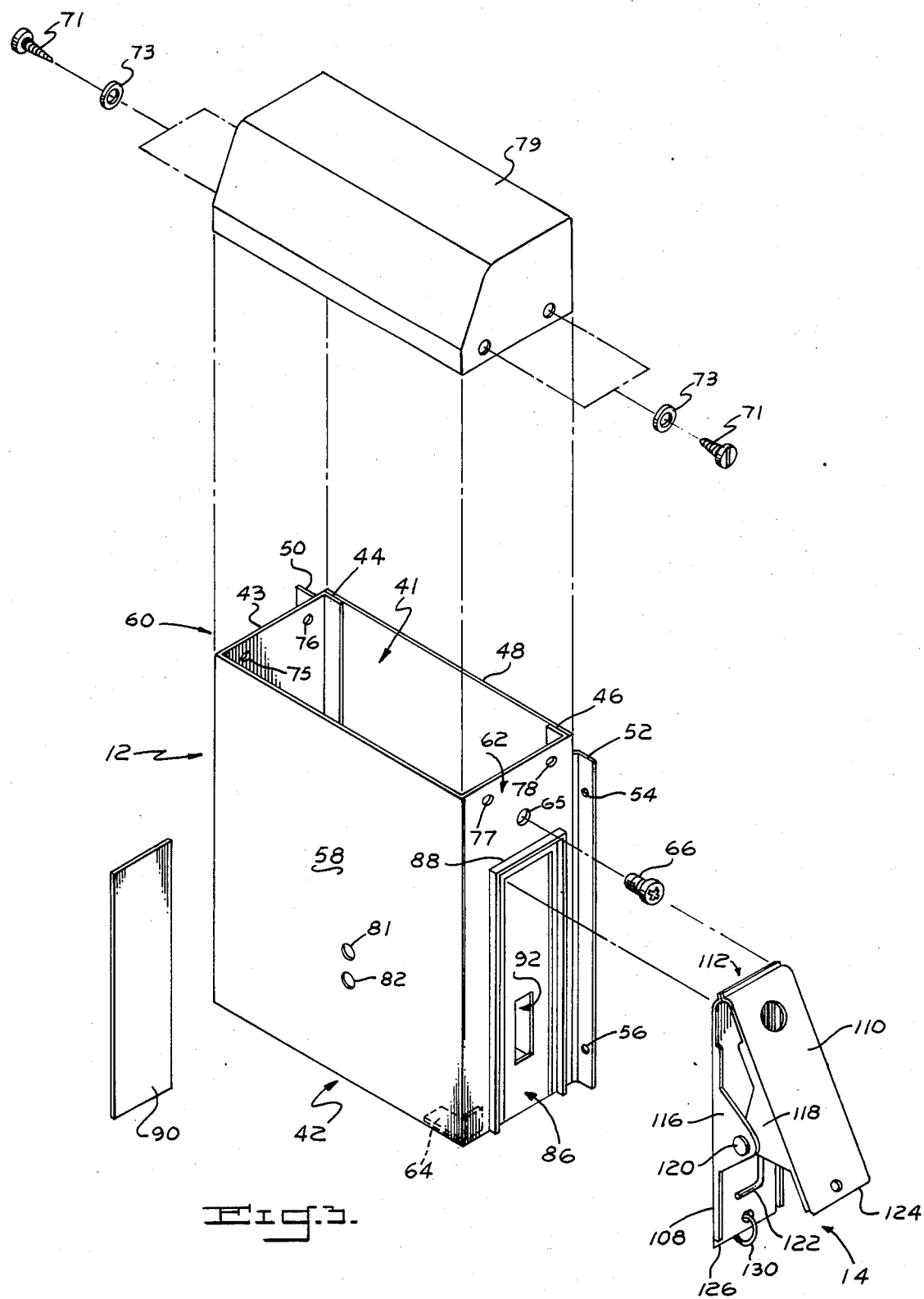
FIG. 3 is an exploded view of an outer shell for the unit, along with a clamp that is used to attach the FIG. 1 cord to a trailer.
Figure 3A:
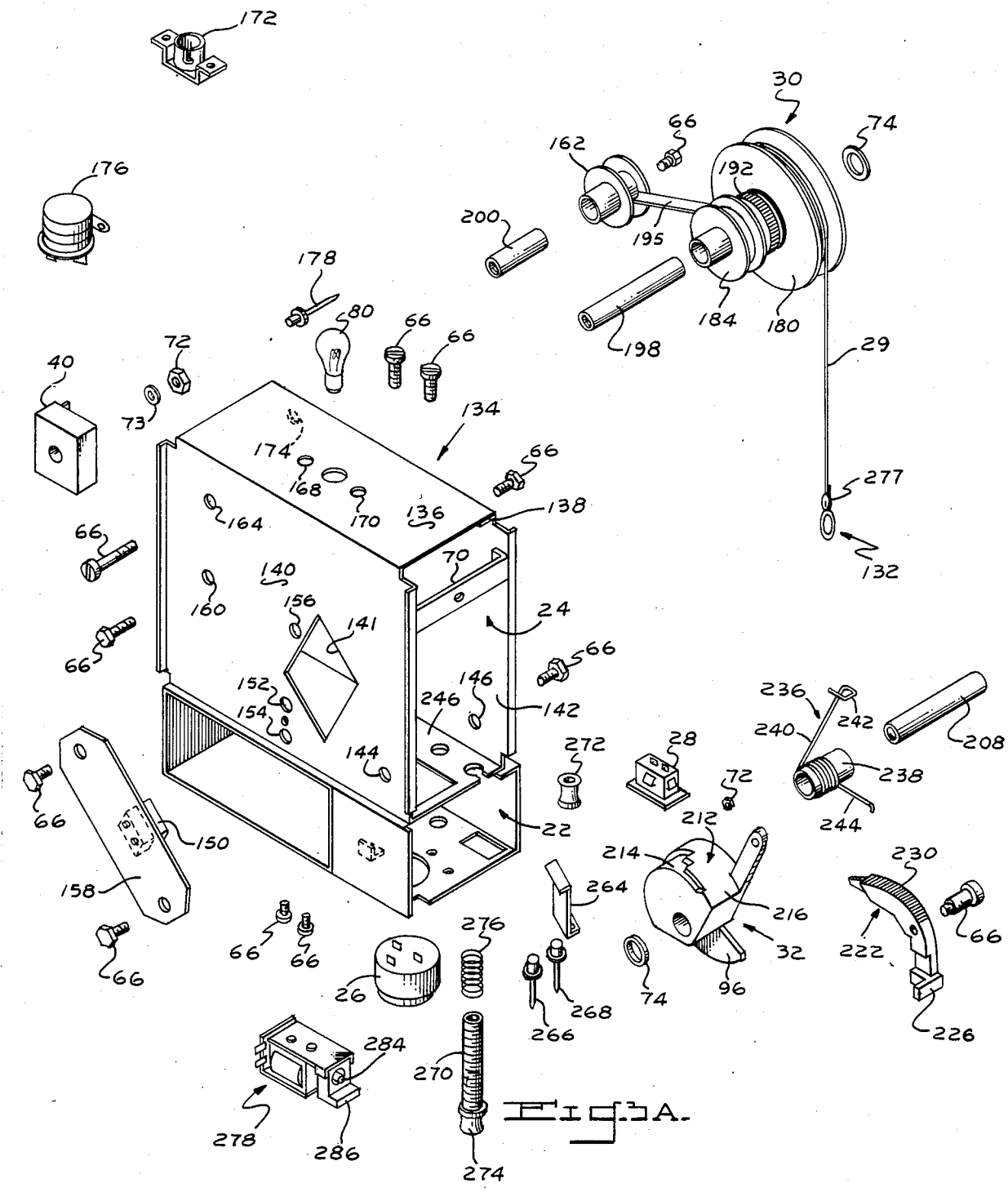
FIG. 3A is an exploded view of the mechanical and electrical innards of the unit.
Figure 4:
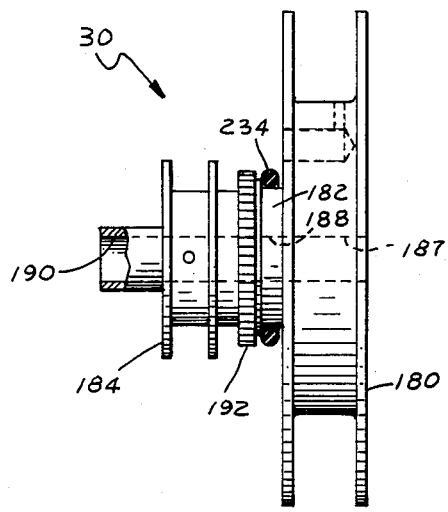
FIG. 4 is a side elevational view of a spool assembly shown in FIG. 3A.
Figure 5:
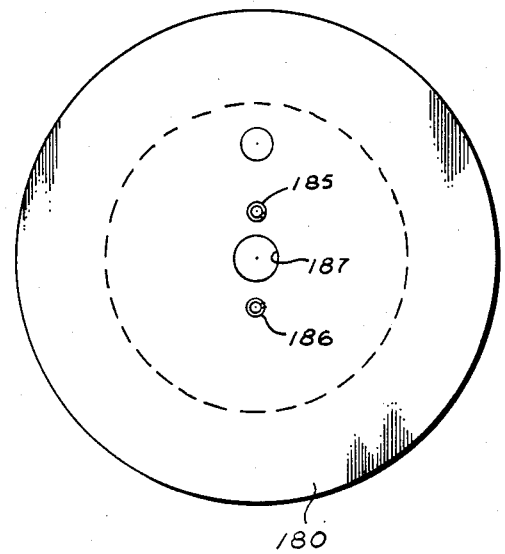
FIG. 5 is a rear plan view of the spool assembly.
Figure 6:
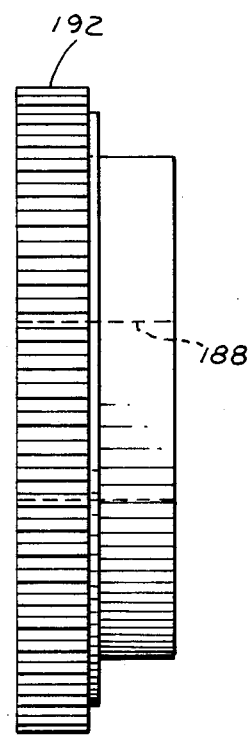
FIG. 6 is a side elevational view of a gear spool that forms part of the spool assembly.
Figure 7:
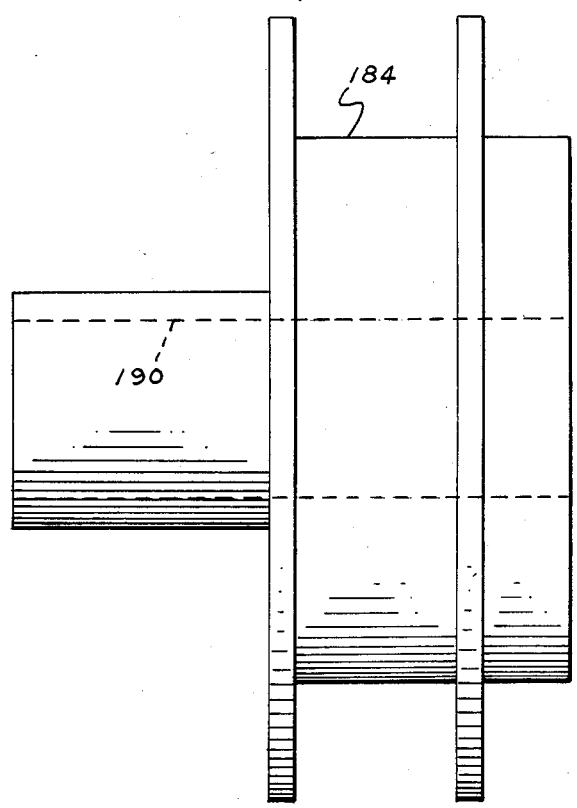
FIG. 7 is a side elevational view of a drive spool used in the preferred spool assembly.

As best shown in FIGS. 3A and 4, spool assembly 30 basically comprises three separable pieces: a cord storage spool 180, a gear spool 182 and a drive spool 184. They are interconnected by bolts (not shown) that pass through small coaxial throughbores, with two such bores shown at 185, 186 (see FIG. 5).

The storage spool 180 has a pulley-shaped body with a central throughbore 187 that aligns with coaxial throughbores 188, 190 in the gear spool 182 and drive spool 184. The gear spool 182 has a peripheral set of gear teeth 192 (see FIG. 6).

A standard spring negator motor 195, such as Ametek, Inc.'s Model No. 3426, interconnects the spool assembly 30 to adjacent drive spool 162. It acts as a wrap spring to spring load spool assembly 30 and retract cord 29, and its opposite ends (not shown) are screwed into the two drive spools 162, 184.

The spool assembly 30 and drive spool 162 are respectively mounted on steel tubes 198, 200 with full internal threads. Tube 198 passes through throughbore 202 of drive spool 162 and is then bolted into place through hole 160 and its aligned hole (not shown) in the opposite side 142. Similarly, tube 200 passes through aligned bores 187, 188, 190 and is then bolted in place through hole 156 and its aligned hole (not shown) in side 142.

Actuating arm 32 is also mounted inside compartment 24, basically to the right and front of spool assembly 30. It includes a main body 204 with a central bore 206 through which another steel mounting tube 208 protrudes. This tube has internal threads and is secured to sides 140, 142 by bolts that pass through holes 144, 146.

The main body 204 resembles a flat-sided football helmet. As best shown in FIGS. 3A, 12 and 13, it has a flat underside or ledge 210 with an arcuate upper surface 212 extending from it. The upper surface acts as a cam to sequentially activate the three switches of microswitch 150. It does so by three steps that separate a valley 214 from an upper plateau 216. Each step is designed to strike one of the switches.

A thin mounting flange 218 extends upwardly and outwardly from the arm's main body 204. It includes a hole 220 for pivotally attaching a pawl 222 to the arm.

Referring to FIGS. 3A and 9-11, pawl 222 looks like a scythe with teeth on it. It is made of heavy-duty plastic, as is arm 32. It comprises a vertical, stepped stem 224 with a stop 226 at its lower end. The stop is an L-piece designed to hit flange 218 and prevent rotation of the pawl in a clockwise direction (relative to its FIG. 16 orientation).

An integral, arcuate portion 228 extends from the top of the stem. When pawl 222 is mounted inside compartment 24, this arcuate portion points toward the center of the compartment. This pawl portion has a row of gear teeth 230 along its upper edge. The teeth are designed to mesh with gear teeth 192 of the spool assembly's gear spool 182.

A side finger 232 is mounted alongside the arcuate portion 228 and extends beyond the arcuate portion's tip to give the scythe-like effect. This finger has an upper knurled surface 233 that is designed to abut an O-ring 234 on gear spool 182. This finger provides a "rubbing surface" against the O-ring to allow a smooth, ratchetless disengagement of the pawl and gear 182 when the alarm is being shut off.

As viewed in the FIG. 3 orientation, the actuating arm 32 is constantly biased is a counterclockwise direction via torsion wrap spring 236. This spring is mounted on a sleeve 238 located atop shaft 208. It includes two arms 240, 242. One arm 240 has a crooked end 242 that locks against flange 218, while the other arm 244 is designed to bear against the compartment's bottom plate 246 to build up torsional pressure.

Figure 14:
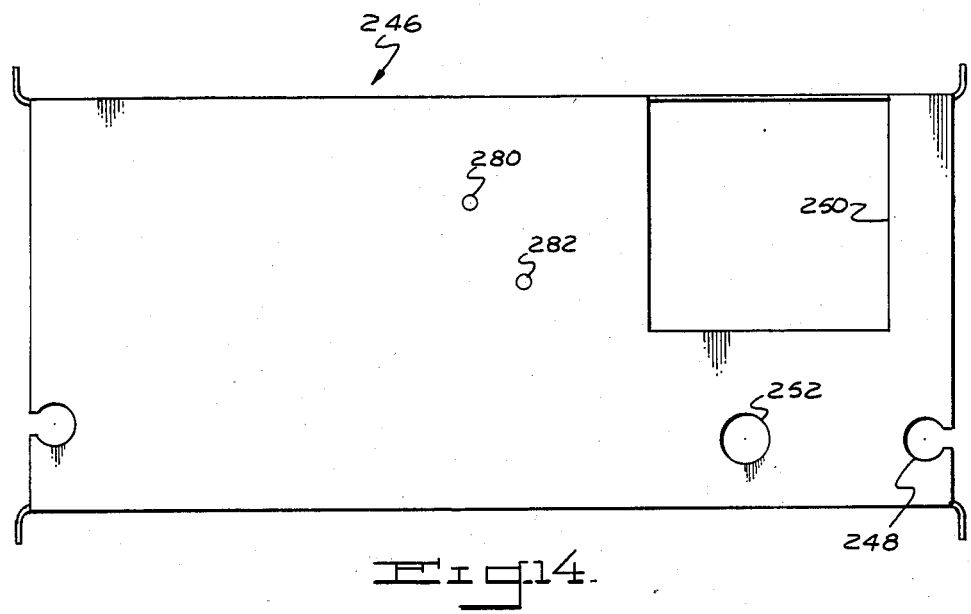
FIG. 14 is a bottom plan view of a central mounting plate shown in FIG. 3A.

FIG. 14 shows the underside of plate 246. As viewed from right to left, the bottom includes a circular end cutout 248 for permitting wiring to interconnect the upper compartment's components with those located in the lower compartment. Since all wiring for this unit is standard, it has been omitted for the sake of drawing clarity.

Bottom 246 includes a rectangular cutout 250 that permits rotation through it of the ledge 210 of actuating arm 232. It also includes an adjacent, circular cutout 252 that acts as a feedhole for cable 29.

Welded onto the bottom 246 of upper compartment 24 is a U-shaped piece 254 formed from sheet metal. Together they form lower compartment 22, which serves as the buzzer-and-battery housing.

Figure 15:
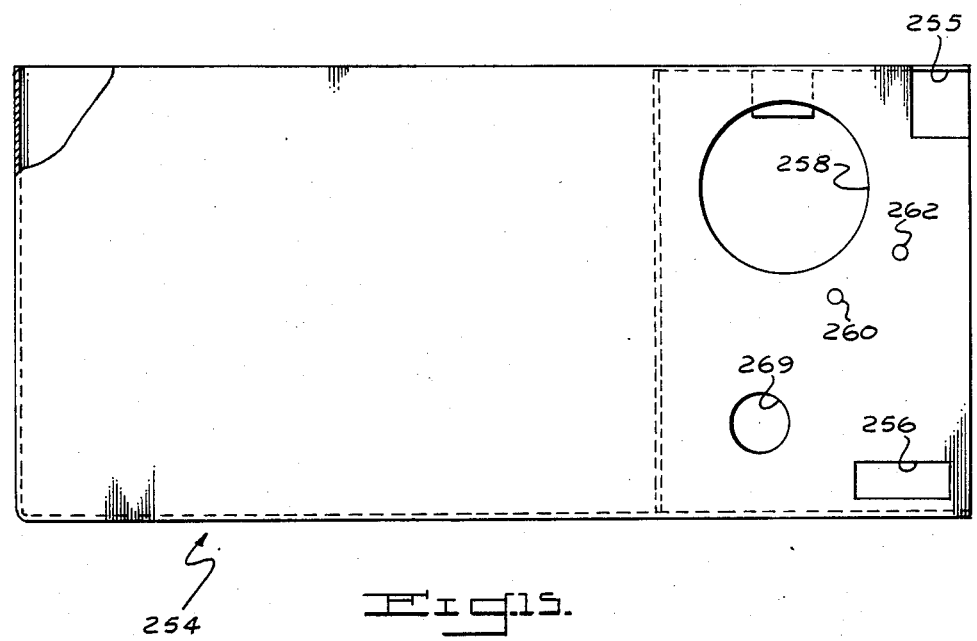
FIG. 15 is a bottom plan view of a buzzer-and-battery subhousing shown in FIG. 3A.
Figure 16:
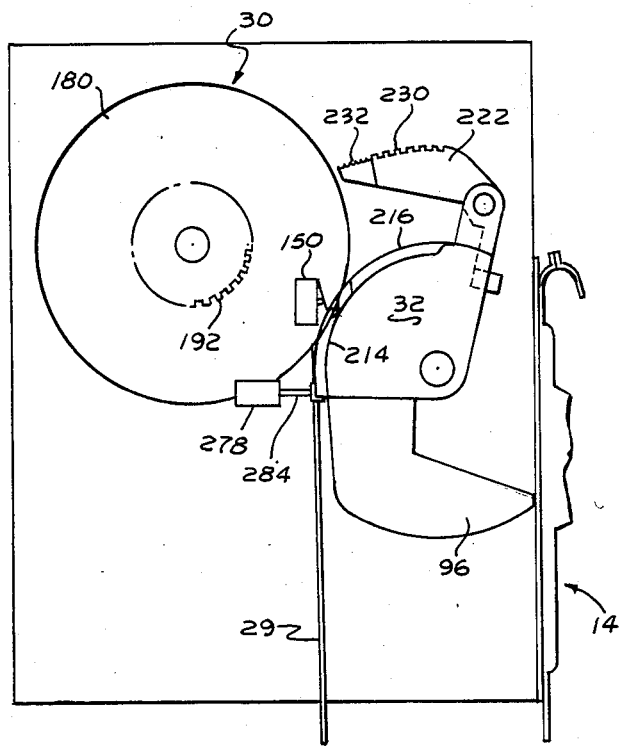
FIGS. 16–19 are schematic views of the preferred alarm in various stages of operation.
Figure 17:
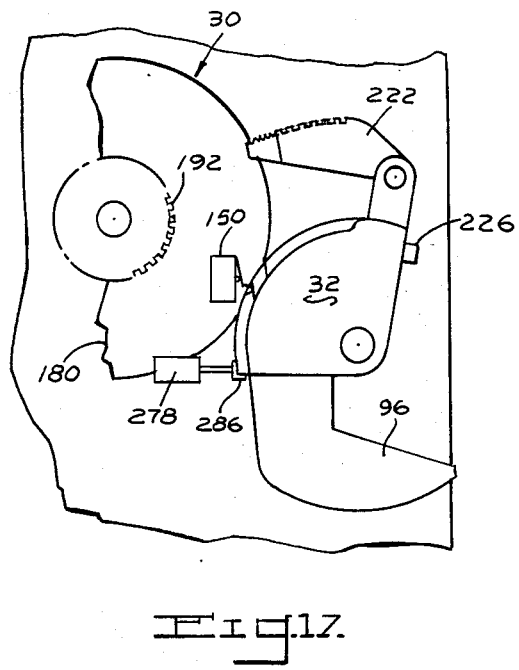
Figure 18:
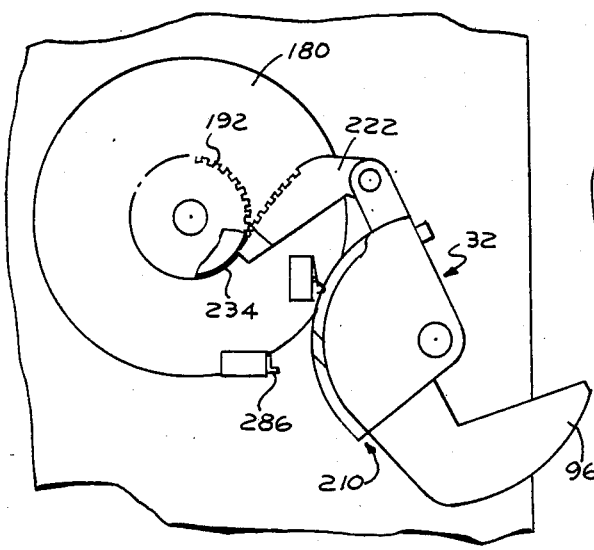
Figure 19:
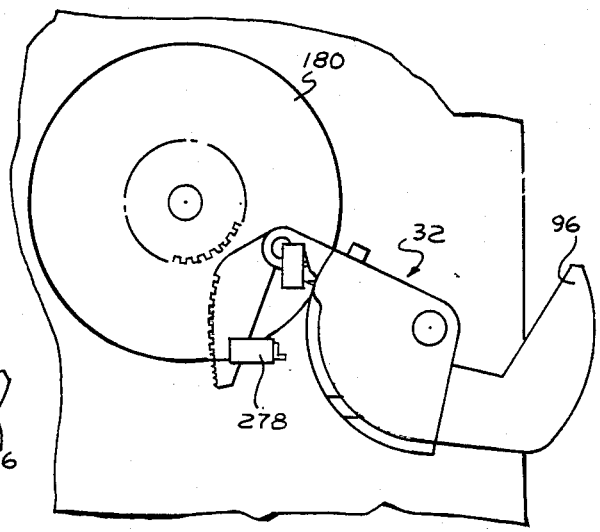

As best shown in FIG. 15, lower compartment 22 includes a rectangular corner cutout 255 so that the bottom of compartment 22 can slip past the L-shaped stop 64 welded inside shell 12 (see FIG. 3). While the cutout and stop are designed to permit a small amount of play in assembling the unit, the stop 64 is also designed to abut the bottom of plate 246, if necessary, to prevent the inner frame 20 from slipping out of the shell 12.

Lower compartment 22 also includes a rectangular cutout 256, near an opposite corner from cutout 255, for housing a standard battery recharger 28, such as Model No. 668 manufactured by Adcour Electronics, Inc.; an adjacent hole 258 for mounting a standard horn 26 in it, such as Adcour's Model No. 668; a pair of adjacent, smaller holes 260, 262 for attaching an L-shaped horn bracket 264 by the pop rivets shown at 266, 268; a larger hole 269 that aligns with feedhole 252 above it to provide an inlet and discharge for a spring-loaded cable guide 270 that extends between them.

Guide 270 comprises a flexible metal tube having bellmouth caps 272, 274 threaded onto its ends. The tube end with cap 274 extends slightly below plate 246 (approximately one inch in the preferred embodiment) and is biased against the underside of plate 246 by a coiled spring 276. This spring pushes against the plate and the bellcap and acts as a shock absorber when the cable 29 has been retracted too quickly.

Note that a ball stop or sleeve 277 is attached to the cord end 132 (see FIG. 3A). It is larger than the guide tube's inner diameter, and is designed to hit against the tube and thereb prevent overtravel during cable retraction.

Bolted onto the underside of plate 246 and located inside lower compartment 22 is a solenoid 278. This solenoid is a standard piece, such as Model No. 65274 by Necom Corp., that has been attached through holes 280, 282 (see FIG. 14).

When de-energized, this solenoid has an arm 284 that is normally extended. To this arm, an L-shaped locking shoulder 286 is attached. When the solenoid is de-energized, its arm is extended and the upper surface of this locking shoulder underlies the bottom of ledge 210 of actuating arm 32 to prevent the arm from rotating. If the solenoid becomes energized, the shoulder 286 withdraws and the arm is permitted to rotate counterclockwise (as caused by spring 236).

FIGS. 16-19 show the various operational stages of the preferred Creep Alarm 10. To store the device in an "off" position, clamp 14 is simply magnetically mounted onto the shell or housing 12 (see FIG. 16). The back of magnetic plate 90 then presses against the arm's flag portion 96 so the arm's valley 214 overlies each of the three switches of microswitch 150. The undepressed switches are open and the alarm is off.

To operate the device, the operator simply removes the clamp 14 from its storage position and attaches it to the truck 16. In this position (see FIG. 17), the device will automatically arm itself after a preset delay of, for example, thirty seconds. Once the device is armed, any movement of the trailer away from the dock by a preset distance will cause the alarm 10 to activate, whereupon the horn 26 turns on and the light 80 flashes.

The automatic arming of the device is accomplished by the spring-loaded actuating arm 32. When the clamp 14 is removed from the housing, it no longer presses against the arm's flag tip. The arm is thereby free to pivot counterclockwise, approximately 5°, until its ledge 210 abuts the solenoid's locking shoulder 286.

Figure 2:
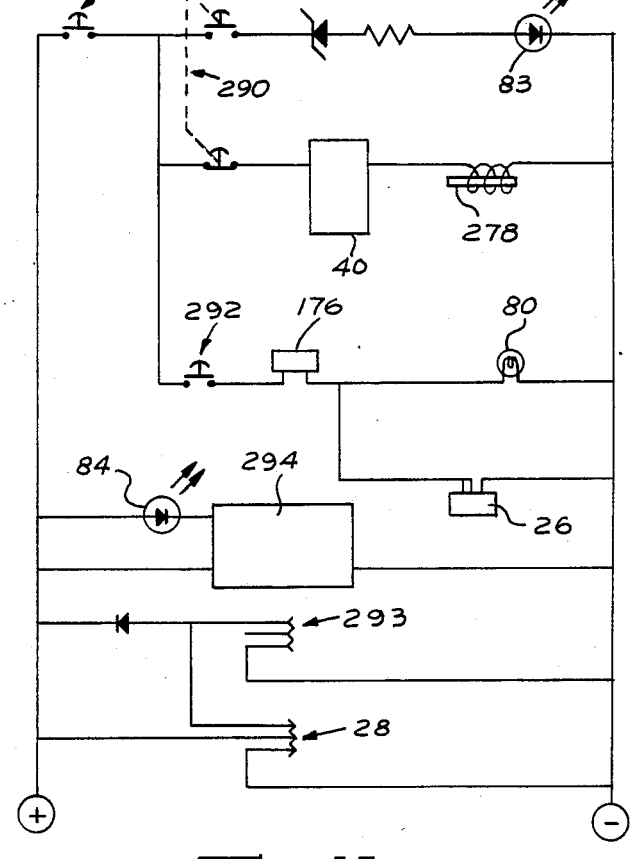
FIG. 2 shows the schematic of the alarm's internal circuitry.

Referring to FIG. 2, during this minute rotation, the first microswitch 288 (of the triple switch 150) is tripped by the innermost step atop arm 32. This action activates timer 40. After the timer times out, the solenoid 278 is engaged, releasing the spring-loaded actuating arm 32. The arm is then free to rotate some more and continues until the pawl's gear teeth 230 rest against the gear teeth 192 of spool assembly 30. During this movement, a second, double-throw microswitch 290 is engaged by the middle step atop arm 32. This second switch deactivates the solenoid, and the mechanism is now armed. To show this, the green "on" L.E.D. 83 shines through hole 81.

Any subsequent forward movement or creepage by the trailer 16 tugs the cord 29 and causes the spool assembly 30 to rotate in a clockwise direction. The assembly's gear teeth 192 simultaneously mesh with the pawl 222 to drivingly rotate it in a counterclockwise direction. If the creepage exceeds a preselected amount, e.g., four inches, the pawl will fall past the gear teeth 192 and cause a third microswitch 292 to engage (see FIGS. 19 and 20). The third microswitch energizes the alarms.

Once the alarm is activated, it can only be de-energized by depressing the arm's flag portion 96 back into the housing and thereby disengaging the third microswitch. The flag 96 can be depressed into the housing by hand or by simply replacing the clamp back on the housing. Once the flag is released from the housing again, the timing sequence begins anew.

If the device is armed but does not alarm, the operator simply removes the clamp from the truck and replaces it on the housing 12 when he is finished. While the clamp is being remounted, the mechanism of pawl 222 allows the cord 29 to be smoothly and quietly retracted onto the spool assembly 30. The knurled portion 233 atop pawl 222 rides on the O-ring 234 of spool assembly 30 to prevent gear-teeth chatter as the assembly is being rotated in a counterclockwise direction by the spring negator motor 195. Note that when the clamp 14 is placed back onto the housing, the actuating arm 32 and pawl 222 will rotate back to their FIG. 16 "off" positions.

The alarm 10 can be powered by a battery or a power supply which converts 120 volt AC to 12 volts DC. In the preferred embodiment, a rechargeable battery 293 has been utilized (see FIG. 2) and provisions for a battery charger connected to the unit have been made. A low battery detector 294 is also provided, such as Adcour's Model No. 668.

The preferred embodiment 10 is nicknamed the "Automatic Turn-On System" because it is an automatically armed unit. When it is not so important to have everything automatic, a second, more manual unit can be utilized. This unit is shown in FIGS. 20-24 and is accordingly nicknamed the "Manual Turn-On System". It is generally designated by the reference numeral 300.

The manual embodiment 300 includes an outer housing 302 (see FIG. 20) that can be bolted onto a loading dock by any suitable means, such as brackets 303, 304. Like shell 12 of the automatic embodiment, housing 302 contains an inner mechanism for an alarm, with this mechanism being shown in schematic form in FIGS. 22-24. The housing also supports a switch handle 306 for manually readying the alarm, an alarm horn 308 and a "power-on" indicator light at 310. A magnetic plate 312 is attachable to the housing's side 314 and is connected to a spring-tensioned cord 316 that extends from the housing.

As shown in FIG. 22, the inner mechanism of this embodiment includes a spring-loaded spool assembly 318 with gear teeth 320 along the lower quadrant of its periphery. An upwardly opening conical cam or offset piece 322 is fixedly mounted on a switch shaft 324 for excentric rotation thereon when the switch handle 306 (attached to shaft 324) is manually turned. Cam 322 has an upper row of gear teeth 325 that are designed to mesh with the spool teeth 320 after this rotation, and is attached to a fixed location 326 by a spring 328.

Two spaced stops 330, 332 bracket the bottom of cam 322. Between and below the stops is a first microswitch 334. It is located so as to be triggered by a flat, left-hand surface 336 (as viewed in FIG. 22) of the cam. A second microswitch 337 is located to the right of the stops (as viewed in FIG. 22) and is designed to be triggered by the flat, right-hand surface 338 of the cam.

FIGS. 22-24 depict the operation of the inner mechanism. FIG. 22 shows the device in the "off" position. The switch shaft 306 has been rotated counterclockwise so that the cam 322 has its center of rotation (at 340) below that of the fixed switch shaft. When the cam is "down", its gear teeth 325 have been pulled away from the spool's gear teeth 320 so that no contact is made between them. The switch spring piece 328 pulls the cam 322 against stop 330 and prevents it from moving from this position when the unit is off. When the cam is in the "off" position, it depresses microswitch 334, which is a normally closed switch. When this switch is depressed, the alarm circuit (see FIG. 21) is de-energized due to the switch "going open". The alarm microswitch 337 is a normally open switch and is open when the circuit is off.

After the magnetic plate 312 is attached to the trailer and cord 316 is pulled out, the unit is set in a "ready" position by rotating the switch handle 180° in a clockwise direction. FIG. 23 shows the inner mechanism in this "ready" or "on" position. Note that the manual rotation of handle 306 has turned the cam 322 such that the cam's center of rotation 340 is now above shaft 324. The teeth 325 of the cam gear mesh with the teeth 320 of the spool gear.

The unit 300 remains in this "on" condition until the trailer begins to creep or move away from the dock. With the cam 322 shown in this "on" position, the microswitch 324 is in its normally closed position and completes part of the alarm circuit (see FIG. 21).

When the truck moves, the magnet 312 is pulled with it and the cord 316 is tugged. This tugging causes spool assembly 318 to rotate counterclockwise which, in turn, causes the cam 322 (through teeth 325) to rotate counterclockwise. When the spool assembly rotates far enough, the line of action of the spring 328 crosses the cam's center of rotation 340. When this occurs, the cam drops down to its FIG. 24 position and depresses microswitch 337. The switch then closes the alarm circuit and sounds the alarm. As shown in FIG. 21, a latch relay 342 is provided so that the alarm stays on until the unit is manually turned off.

To turn off the unit, the switch handle is rotated 180° in a counterclockwise direction. When the unit is being switched off after the alarm has sounded, the cam 322 rotates back to its FIG. 22 position. In this "off" position, the cam's center of rotation is again below the rotational axis of switch shaft 324. During turning of the handle, when the line of action of the spring 328 crossed to the other side of the cam's center of rotation (as compared to its line of action shown in FIG. 24), the spring assisted in returning the cam to its "off" position. When the cam has been turned to this position, microswitch 334 is depressed to open the alarm circuit, whereupon the relay delatches and the alarm shuts off.

It should be understood by those skilled in the art that obvious structural modifications can be made without departing from the spirit of the invention. For example, in both of the disclosed embodiments, rechargeable batteries are utilized and a battery recharger is connected to each unit. Alternatively, the devices can be powered by an autonomous battery or by a power supply which converts into 120 volt AC to 12 volts DC. Further, instead of meshing gear teeth in the "manual" embodiment, other means of interference could conceivably be used, such as VELCRO ® fastening strips. Accordingly, reference should be made primarily to the accompanying claims, rather than the foregoing specification, to determine the scope of the invention.

Having thus described the invention, what is claimed is:

1. A creep alarm comprising:
   (a) an outer housing that is adapted to be fastened onto a wall at a loading dock;
   (b) a clamp that is magnetically held against the outside of the housing and which can be removed for quick attachment to a nearby trailer or truck;
   (c) said clamp being connected to a free end of a spring-tensioned, retractable cord that is spool fed from inside the housing;
   (d) a spring-loaded spool assembly that is rotatably mounted within the housing for windingly storing the cord;
   (e) means for automatically arming the alarm in a "ready" position after the clamp and cord have been drawn away from the housing and clamped onto the trailer or truck and a preset delay has occurred, wherein the arming means comprises a spring-biased actuating arm that is rotatably mounted within the housing, adjacent to the spool assembly, said arm having a flange that is adapted to extend through a vertical slot in the housing, whereby said flange is normally abutted by the clamp, when the clamp is magnetically held against the housing, to prevent the arm from rotating and accidentally arming the alarm; and,
   (f) triggering means for automatically turning on an electrically operated horn inside the housing if the cord is subsequently tugged a preselected amount after the clamp and cord have been drawn away from the housing and the alarm has been armed.

2. The alarm of claim 1 wherein the actuating arm has a three-stepped upper surface that acts as a cam to sequentially trip three adjacent microswitches when the arm is permitted to rotate.

3. The alarm of claim 2 wherein the arm has an attached pawl with gear teeth on it that is adapted to engage a gear on the spool assembly when the arm is initially rotated and thereby to prevent further arm rotation until the cord is subsequently tugged.

4. The alarm of claim 3 wherein the arming means further comprises a solenoid that is mounted inside the housing, said solenoid having a movable L-shaped shoulder piece that is adapted to normally underlie a bottom ledge of the actuating arm and thereby prevent the arm from rotating beyond the initial amount.

5. The alarm of claim 4 wherein a timer is electrically connected to the solenoid and energizes the solenoid to withdraw the shoulder from under the arm's ledge and thereby allow the arm to further rotate.

6. A creep alarm comprising:
   (a) an outer housing that is adapted to be fastened onto a wall at a loading dock;
   (b) a clamp that is magnetically held against the outside of the housing and which can be removed for quick attachment to a nearby trailer or truck;
   (c) said clamp being connected to a free end of a spring-tensioned, retractable cord that is spool fed from inside the housing;
   (d) a spring-loaded spool assembly that is rotatably mounted within the housing for windingly storing the ccord;
   (e) means for automatically arming the alarm in a "ready" position after the clamp and cord have been drawn away from the housing and clamped onto the trailer or truck and a preset delay has occurred, wherein said arming means comprises:
      (i) a spring-biased actuating arm that is rotatably mounted within the housing, adjacent to the spool assembly, said arm having a flange that is adapted to extend through a slot in the housing, whereby said flange is normally abutted by the clamp, when the clamp is magnetically held against the housing, to prevent the arm from rotating and arming the alarm while the clamp is mounted;

(ii) a timing mechanism mounted inside the housing that cooperates with the arm to prevent it from rotating beyond an initial amount until after the delay occurs;

(f) triggering means for automatically turning on an electrically operated horn inside the housing if the cord is subsequently tugged a preselected amount, said triggering means comprising:

(i) a pawl attached to the arm, adjacent to the spool assembly, said pawl having gear teeth on it that are adapted to engage a gear on the spool assembly when the alarm is armed; and, (ii) a microswitch that is mounted inside the housing, adjacent the arm, whereby the switch is adapted to be tripped by a stepped surface on the arm when the cord is tugged a preselected amount and the spool assembly's teeth concurrently, rotatably drive the pawl and the attached actuating arm.

7. The alarm of claim 6 wherein the actuating arm has a three-stepped upper surface that acts as a cam to sequentially trip three adjacent microswitches when the arm is permitted to rotate.

8. The alarm of claim 7 wherein a plurality of microswitches are mounted inside the housing, adjacent the arm, whereby the switches are adapted to be sequentially tripped by a 3-stepped surface on the rotatable actuating arm.

9. A creep alarm comrpising:

(a) an outer housing that is adapted to be fixedly attached onto a loading dock;

(b) a fastening means on the outside of the housing which can be drawn away from the housing for quick fastening onto a nearby trailer or truck;

(c) said fastening means being connected to a free end of a spring-tensioned, retractable cord that is spool fed from inside the housing;

(d) a spring-loaded spool assembly that is rotatably mounted within the housing for windingly storing the cord;

(e) means for automatically arming the alarm in a "ready" position after the fastening means and cord have been drawn away from the housing and fastened onto the trailer or truck and a preset delay has occured, wherein the arming means comprises a spring-biased actuating arm that is rotatably mounted within the housing, adjacent to the spool assembly, said arm having a flange that is adapted to extend through a vertical slot in the housing, whereby said flange is normally abutted by the clamp, when the clamp is magnetically held against the housing, to prevent the arm from rotating and arming the alarm; and, (f) triggering means for automatically turning on an electrically operated horn inside the housing if the cord is subsequently tugged a preselected amount after the clamp and cord have been drawn away from the housing and the alarm has been armed.

10. The alarm of claim 9 wherein the actuating arm has a three-stepped upper surface that acts as a cam to sequentially trip three adjacent microswitches when the arm is permitted to rotate.

11. The alarm of claim 10 wherein the arm has an attached pawl with gear teeth on it that is adapted to engage a gear on the spool assembly when the arm is initially rotated and thereby to prevent further arm rotation until the cord is subsequently tugged.

12. The alarm of claim 11 wherein the arming means further comprises a solenoid that is mounted inside the housing, said solenoid having a movable L-shaped shoulder piece that is adapted to normally underlie a bottom ledge of the actuating arm and thereby prevent the arm from rotating beyond the initial amount.

13. The alarm of claim 12 wherein a timer is electrically connected to the solenoid and energizes the solenoid to withdraw the shoulder from under the arm's ledge and thereby allow the arm to further rotate.

14. The alarm of claim 9 wherein the fastening means comprises a spring-loaded clamp.

15. The alarm of claim 9 wherein the fastening means comprises a magnetic plate.

16. A creep alarm comprising:

(a) an outer housing that is adapted to be fixedly attached onto a loading dock;

(b) a fastening means removably mounted on the outside of the housing and which can be drawn away from the housing for quick fastening onto a nearby trailer or truck;

(c) said fastening means being connected to a free end of a spring-tensioned, retractable cord that is spool fed from inside the housing;

(d) a spring-loaded spool assembly that is rotatably mounted within the housing for windingly storing the cord;

(e) means for automatically arming the alarm in a "ready" position after the fastening means and cord have been drawn away from the housing and fastened onto the trailer or truck and a preset delay has occurred, wherein said arming means comprises:

(i) a spring-biased actuating arm that is rotatably mounted within the housing, adjacent to the spool assembly, said arm having a flange that is adapted to extend through a slot in the housing, whereby said flange is normally abutted by the fastening means, when the fastening means is mounted against the housing, to prevent the arm from rotating and arming the alarm;

(ii) a timing mechanism mounted inside the housing that cooperates with the arm to prevent it from rotating beyond an initial amount until after the delay occurs;

(f) triggering means for automatically turning on an electrically operated horn inside the housing if the cord is subsequently tugged a preselected amount, said triggering means comprising:

(i) a pawl attached to the arm, adjacent to the spool assembly, said pawl having gear teeth on it that are adapted to engage a gear on the spool assembly when the alarm is armed; and, (ii) a microswitch that is mounted inside the housing, adjacent the arm, whereby the switch is adapted to be tripped by a stepped surface on the arm when the cord is tugged a preselected amount and the spool assembly's teeth concurrently, rotatably drive the pawl and the attached actuating arm.

17. The alarm of claim 16 wherein the actuating arm has a three-stepped upper surface that acts as a cam to sequentially trip three adjacent microswitches when the arm is permitted to rotate.

18. The alarm of claim 17 wherein a plurality of microswitches are mounted inside the housing, adjacent the arm, whereby the switches are adapted to be sequentially tripped by a three-stepped surface on the rotatable actuating arm.

19. The alarm of claim 16 wherein the fastening means comprises a spring-loaded clamp.

20. The alarm of claim 16 wherein the fastening means comprises a magnetic plate.

21. A creep alarm comprising:
   (a) an outer housing that is adapted to be fixedly attached onto a loading dock;
   (b) a fastening means removably mounted on the outside of the housing and which can be drawn away from the housing for quick fastening onto a nearby trailer or truck:
   (c) said fastening means being connected to a free end of a spring-tensioned, retractable cord that is spool fed from inside the housing;
   (d) a spring-loaded spool assembly that is rotatably mounted within the housing for windingly storing the cord, said assembly having a set of gear teeth on its periphery;
   (e) means for arming the alarm in a "ready" position after the fastening means and cord have been drawn away from the housing and fastened onto the trailer or truck, wherein said arming means comprises:
      (i) a spring-biased cam that is rotatably mounted within the housing, said cam comprising a conical plate that is fixedly mounted on a shaft for eccentric rotation adjacent the spool assembly, wherein said plate has a set of gear teeth that are adapted to mesh with the spool assembly's gear teeth when the cam is rotated;
      (ii) a switch handle that is located on the outside of the housing and which is fixedly mounted onto the cam shaft, whereby selective turning of the handle causes the cam to rotate and engage with the spool assembly's teeth; and,
   (f) triggering means for automatically turning on an electrically operated horn inside the housing if the cord is subsequently tugged a preselected amount, said triggering means comprising a pair of microswitches that are mounted within the housing, adjacent the cam whereby one of the said switches is adapted to be tripped by a side of the cam plate when the switch handle is manually turned to an "off" position and the other switch is adapted to be automatically tripped by an opposite side of the cam plate after the cord is tugged a preselected amount and the spool's teeth concurrently rotate the cam through the cam's gear teeth.

22. The alarm of claim 21 wherein the fastening means comprises a spring-loaded clamp.

23. The alarm of claim 21 wherein the fastening means comprises a magnetic plate.

24. The alarm of claim 21 wherein the alarm further comprises a means for automatically maintaining the horn in an activated mode after it is triggered.

25. The alarm of claim 22 wherein said maintaining means comprises an electric relay that is interconnected with said horn and said other microswitch.

26. The alarm of claim 22 wherein said maintaining means includes a coiled spring inside the housing, wherein said spring has one end fixedly connected to the housing and its opposite end fixedly attached to the cam plate adjacent the plate's center of rotation.

27. A creep alarm comprising:
   (a) an outer housing that is adapted to be fixedly attached onto a loading dock:
   (b) a magnetic plate removably mounted on the outside of the housing and which can be drawn away from the housing for quick fastening onto a nearby trailer or truck;
   (c) said magnetic plate being connected to a free end of a spring-tensioned, retractable cord that is spool fed from inside the housing;
   (d) a spring-loaded spool assembly that is rotatably mounted within the housing for windingly storing the cord, said assembly having a set of gear teeth on its periphery;
   (e) a spring-loaded cam that is rotatably mounted within the housing, said cam comprising a conical plate that is fixedly mounted on a shaft for eccentric rotation adjacent the spool assembly, wherein said plate has a set of gear teeth that are adapted to mesh with the spool assembly's gear teeth when the cam is rotated;
   (f) a switch handle that is located on the outside of the housing and which is fixedly mounted onto the cam shaft, whereby selective turning of the handle causes the cam to rotate and engage with the spool assembly's teeth to arm the alarm in a "ready" position after the magnetic plate and cord have been drawn away from the housing and fastened onto the trailer or truck; and,
   (g) a plurality of microswitches mounted within the housing adjacent the cam, whereby one of said switches is adapted to be tripped by a side of the cam plate when the switch handle is manually turned to an "off" position and another of said switches is adapted to be automatically tripped by an opposite side of the cam plate after the cord is tugged a preselected amount and the spool's teeth concurrently rotate the cam through the cam's gear teeth.

* * * * *